(12) United States Patent
Miller et al.

(10) Patent No.: US 6,310,874 B1
(45) Date of Patent: Oct. 30, 2001

(54) LEARN PENDING FRAME THROTTLE

(75) Inventors: David S. Miller, Framingham; Lawrence Aaron Boxer, Carlisle, both of MA (US); Edward A. Heiner, Jr., Londonderry, NH (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/044,294

(22) Filed: Mar. 19, 1998

(51) Int. Cl.[7] .................................................. H04L 12/50
(52) U.S. Cl. .......................... 370/379; 370/392; 370/390
(58) Field of Search .................................. 370/389, 379, 370/255, 397, 392, 390, 254, 412, 395, 235, 437, 222, 400–408, 452–455, 256–258, 461, 427; 709/249, 223, 243, 215, 242, 245; 711/201, 202, 203; 340/825.52, 825.47; 400/408, 452–455; 256/258, 403; 390/392, 461, 255, 427, 401

(56) References Cited

U.S. PATENT DOCUMENTS

| | | | |
|---|---|---|---|
| 5,923,654 | * | 7/1999 | Schnell .................................. 370/390 |
| 5,938,736 | * | 8/1999 | Muller et al. ......................... 370/392 |
| 5,946,313 | * | 8/1999 | Allan et al. ........................... 370/397 |

* cited by examiner

*Primary Examiner*—Huy D. Vu
*Assistant Examiner*—Prenell Jones
(74) *Attorney, Agent, or Firm*—Weingarten, Schurgin, Gagnebin & Hayes LLP

(57) ABSTRACT

Flow of data units to an address resolution processor is controlled to inhibit multiple data units from a single multicast flow from being enqueued with the address resolution processor. In a switch having a plurality of Input/Output Application Specific Integrated Circuits ("I/O ASICs") with a plurality of ports, no more than one data unit from each I/O ASIC is permitted to be enqueued with the address resolution processor at any point in time. A separate learn pending indicator may be defined for each I/O ASIC in the switch.

12 Claims, 4 Drawing Sheets

LEARN PENDING FRAME THROTTLE

CROSS REFERENCE TO RELATED APPLICATIONS

NOT APPLICABLE

STATEMENT REGARDING FEDERALLY SPONSORED RESEARCH OR DEVELOPMENT

NOT APPLICABLE

BACKGROUND OF THE INVENTION

The present invention is generally related to network switches, and more particularly to address learning operations for multicast data units.

Network switches commonly employ an address table to facilitate the flow of data units in a network. The address table includes entries that indicate address information for various devices that are coupled with the network such as other switches, computers and printers. The address information indicates which port or ports in the switch should be employed for forwarding the data unit to a particular device in the network. Following receipt of the data unit the switch attempts to locate an entry in the address table that pertains to the destination address specified in the data unit header. If a pertinent entry is located in the address table then the information contained in that entry is employed to identify the port or ports for "forwarding" of the data unit. If a pertinent entry cannot be located in the address table then the switch may "flood" the data unit by transmitting the data unit through every port except the port on which the data unit was received. Hence, network and switch bandwidth is conserved if a pertinent entry is available in the address table.

It is known to update the address table by "learning" new address information for unicast transmissions. Each data unit includes a header portion with a source address field and a destination address field. Address information can be learned by employing the source address specified in the data unit header. If a first data unit is transmitted from a first device to a second device via the switch, and the switch does not have the address for the first device in its address table, then upon the initial transmission from the first device to the second device, the switch learns the address. If address information for the second device is also unknown, the switch floods the first data unit in order to accomplish transmission to the second device. If the second device responds by transmitting a second data unit back to the first device via the switch then the switch learns the address of the second device from the source address field of the second data unit. The switch employs the address information that was previously learned from the first device to "forward" the second data unit toward the first device via a single port. In a subsequent transmission from the first device to the second device the switch employs the learned address information for the second device to efficiently "forward" the data unit toward the second device via a single port without flooding the data unit through the network.

"Forwarding" can also be employed with multicast transmissions, e.g., where the first data unit is transmitted from the first device to a plurality of devices via the switch. However, the learning operation becomes more complex in the case of a multicast data unit. For example, determining a map of output ports for data unit forwarding is more difficult because calculations are made for each separate path upon which copies of the multicast data unit will be transmitted. Further, multicast traffic tends to be "bursty," so the processor that enables multicast learning operations may be unable to install address information for multicast flows as quickly as the flows are established through the switch. As a result, more data units may be flooded from the switch, so bandwidth use is less efficient.

BRIEF SUMMARY OF THE INVENTION

In accordance with the present invention, in a switch having an address resolution processor for resolving multicast address information from a received data unit, transmission of data units to the address resolution processor is controlled to inhibit multiple data units from a single multicast flow from being enqueued with the address resolution processor. In one embodiment in which the switch includes a plurality of Input/Output Application Specific Integrated Circuits ("I/O ASICs"), each having one segment of a distributed address table and a plurality of ports, no more than one data unit from each I/O ASIC is permitted to be enqueued with the address resolution processor at any point in time.

A learn pending indicator may be employed to implement the described technique. A separate learn pending indicator may be defined for each I/O ASIC in the switch. When a first multicast data unit is received in one of the I/O ASICs, an address table lookup operation is performed based upon information such as a destination Media Access Control ("MAC") address in the header of the multicast data unit. If a pertinent entry is found in the address table then the data unit is forwarded. If no pertinent entry is found in the address table, the state of the learn pending indicator associated with the I/O ASIC that received the data unit is determined. If the learn pending indicator is not set, i.e., no multicast data unit is enqueued with the processor for address resolution, then the first multicast data unit is enqueued with the address resolution processor. The address resolution processor facilitates an address learning operation by prompting a new entry that corresponds to the address information to be entered in each address table segment. If the learn pending indicator is set, i.e., a previous multicast data unit is enqueued with the address resolution processor, then the current multicast data unit is not enqueued with the address resolution processor. In either case the multicast data unit is flooded.

In one embodiment the learn pending indicator is periodically cleared to facilitate switch operation. Multicast data units that are enqueued with the address resolution processor from different I/O ASICs are all placed in a single FIFO queue that is associated with the address resolution processor. Other data units may also be placed in the FIFO queue. The learn pending bit limits buildup of multicast miss traffic in the FIFO queue to facilitate other processing by the address resolution processor. However, a recovery mechanism is also employed to determine when a multicast data unit provided to the FIFO queue has been missed, such as if the FIFO queue overflows. The learn pending indicator is reset after a predetermined number of data units has passed out of the FIFO queue or after a predetermined length of time to facilitate "loss frame recovery." Hence, the learn pending bit is not permitted to become "stuck" in the ON position.

BRIEF DESCRIPTION OF THE SEVERAL VIEWS OF THE DRAWING

The invention will be more fully understood from the following Detailed Description of the Invention, in conjunction with the Drawing, of which.

DETAILED DESCRIPTION OF THE INVENTION

Figure 1:
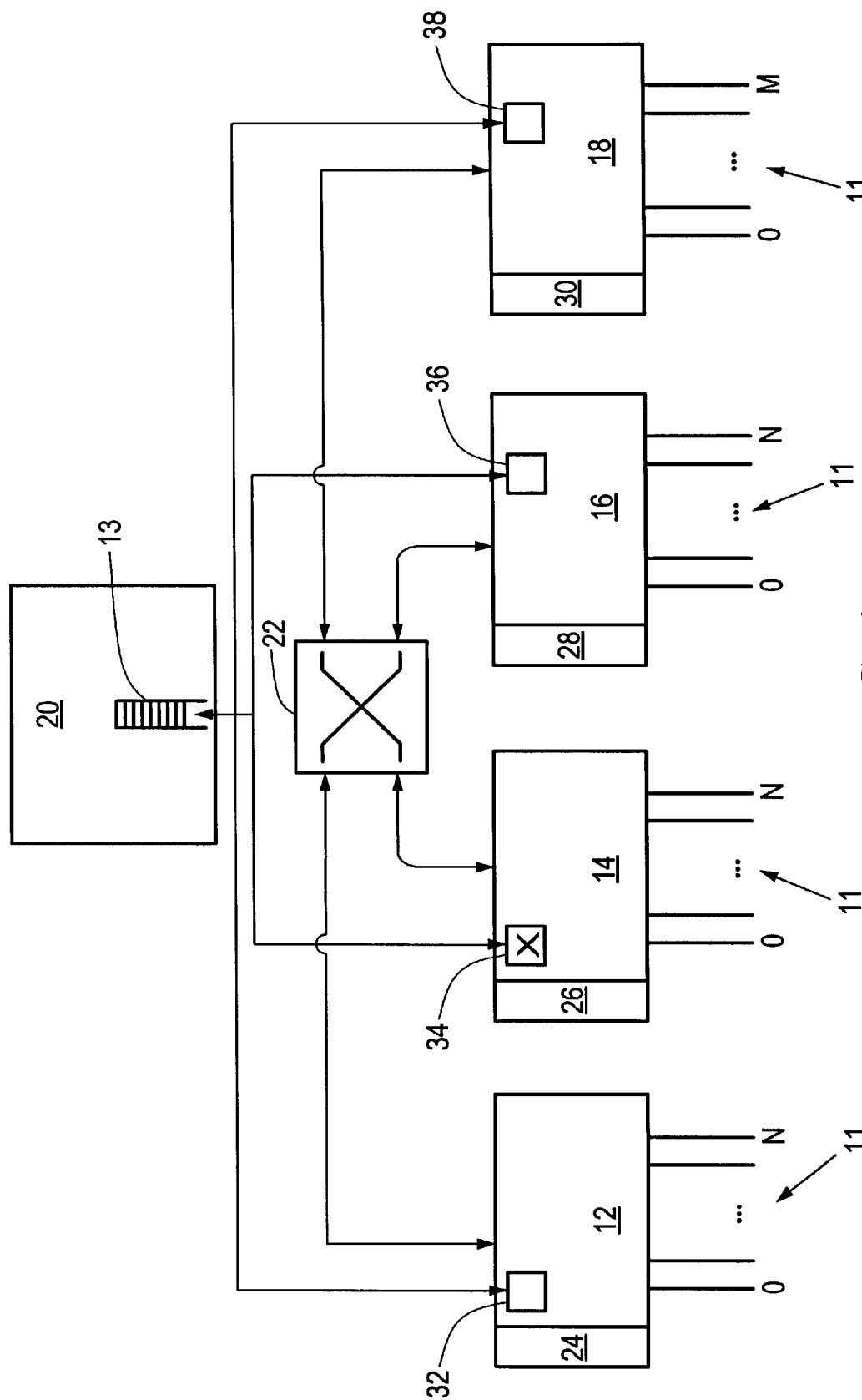
FIG. 1 is a block diagram of a network switch in accordance with the present invention.

FIG. 1 illustrates a switch that facilitates the transmission of data units through a computer network. The switch includes a plurality of Input/Output Application Specific Integrated Circuits ("I/O ASICs") 12, 14, 16, 18 that are interconnected via an address resolution processor 20 and a switch fabric 22 such as a crosspoint ASIC. Each I/O ASIC includes a plurality of ports 11 that are coupled with other devices in the network. Different I/O ASICs may include different numbers of ports. For example, in the illustrated embodiment ASIC 18 includes M ports while ASICs 12, 14, 16 include N ports. Further, different I/O ASICs may support different transmission protocols and different data transmission rates. The switch also includes a distributed address table having a plurality of separate segments 24, 26, 28, 30 each of which is coupled to a different I/O ASIC. In the illustrated embodiment, segment 24 is associated with I/O ASIC 12, segment 26 is associated with I/O ASIC 14, segment 28 is associated with I/O ASIC 16 and segment 30 is associated with I/O ASIC 18.

Figure 2:
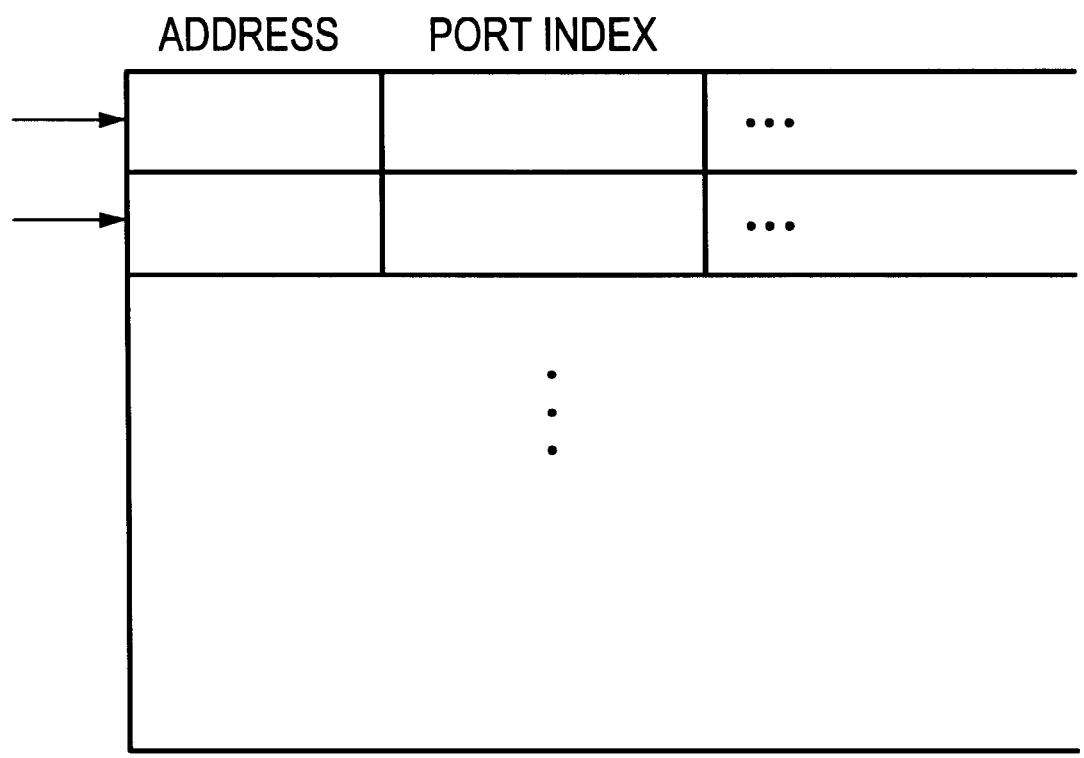
FIG. 2 is a diagram of an address table segment.

Referring to FIGS. 1 and 2, the address table is employed to facilitate processing of data units. In particular, the address table includes entries that indicate address information that may be employed to more efficiently transmit data units to various devices that are coupled to the network such as other switches, computers, and printers. Each entry in the address table includes a tag portion and a port index. The tag may include an address indicator field such as a Media Access Control ("MAC") address. The port index indicates which port or ports 11 in the switch should be employed for forwarding the data unit to a particular device or group of devices. Following receipt of a data unit by an I/O ASIC, the address table segment associated with that I/O ASIC is searched for an entry with an address indicator field that pertains to the destination address specified in the data unit header. If a pertinent entry is located in the address table then the port index contained in that entry is employed to identify the output ports for data unit forwarding. If a pertinent entry is not located in the address table then the switch may "flood" the data unit by transmitting the data unit through every switch port except the port on which the data unit was received.

The address resolution processor may be employed to "learn" address information associated with multicast data units. In the case of a multicast data unit the I/O ASIC examines the data unit to determine the destination MAC address in the data unit header. If no entry corresponding to the destination MAC address is located in the address table segment associated with the I/O ASIC, then the switch may "flood" the data unit by transmitting the data unit through every switch port except the port in which the data unit was received. In addition, the data unit may be forwarded to the address resolution processor 20. The address resolution processor generates a new address table entry that includes the MAC address and the ports associated with the new address as determined by, for example, Internet Group Management Protocol ("IGMP") snooping. The port set/ MAC address mapping information may also come from some outside source, such as a protocol. The new address table entry is stored ("learned") in each address table segment 24, 26, 28, 30. The multicast "learn" operation is initiated by transmitting a copy of the multicast data unit from one of the I/O ASICs to the address resolution processor 20. However, the flow of multicast data units transmitted from the I/O ASICs to the address resolution processor is controlled to facilitate the operation of the switch. In particular, transmission of multicast data units to the address resolution processor is controlled to inhibit multiple multicast data units from a single multicast flow from being enqueued with the address resolution processor. In the illustrated embodiment, no more than one data unit from each I/O ASIC is permitted to be enqueued with the address resolution processor at any point in time.

Transmission of multicast data units to the address resolution processor may be controlled by employing a learn pending indicator such as a flag or control bit. In the illustrated embodiment, separate learn pending indicators 32, 34, 36, 38 are employed to control the flow of multicast data units from each I/O ASIC to the address resolution processor. For example, when a pertinent address table entry for a received multicast data unit cannot be located in the address table segment 26, the receiving I/O ASIC 14 determines whether the learn pending indicator 34 is set for that I/O ASIC. If the learn pending indicator is set, as it is in the present example, then the data unit is simply flooded. If the learn pending indicator is not set, as for example indicator 32 for I/O ASIC 12, the I/O ASIC 12 causes the learn pending indicator 32 to become set and then transmits a copy of the multicast data unit to the address resolution processor 20, in addition to the data unit being flooded. The address resolution processor prompts creation of a new address table entry that includes the destination MAC address of the received data unit and the ports which belong to the multicast, as determined by, for example, IGMP snooping. Hence, each I/O ASIC is permitted one pending learn operation in the address resolution processor at any point in time.

The learn pending indicator may be periodically cleared to facilitate switch operation. Multicast data units that are enqueued with the address resolution processor from different I/O ASICs are all placed in a single FIFO queue 13 that is associated with the address resolution processor 20. Other data units may also be placed in the FIFO queue 13. The learn pending bit limits buildup of multicast miss traffic in the FIFO queue to facilitate other processing by the address resolution processor. However, a recovery mechanism is also employed to determine when a multicast data unit provided to the FIFO queue has been missed, such as if the FIFO queue overflows. The learn pending indicator is reset after a predetermined number of data units has passed out of the FIFO queue or after a predetermined length of time to facilitate "loss frame recovery." Hence, the learn pending bit is not permitted to become "stuck" in the ON position.

Figure 3:
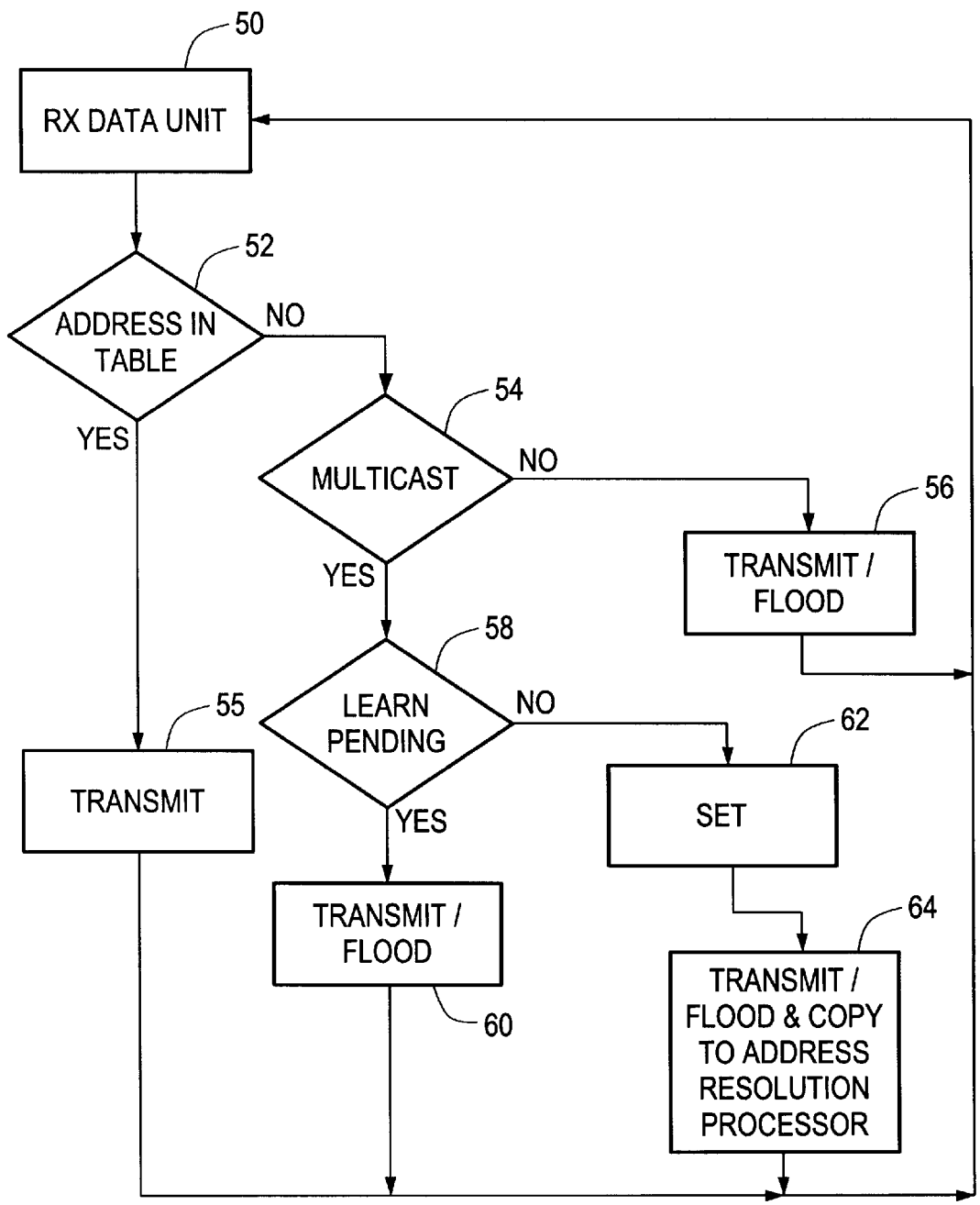
FIG. 3 is a flow diagram that illustrates use of a learn pending indicator.

A method for controlling the flow of data units to the address resolution processor for learn operations is illustrated in FIG. 3. Initially, a data unit is received in one of the I/O ASICs of the switch as indicated by step 50. The I/O ASIC then initiates a search of the address table to determine if the destination address contained in the header of the received data unit is listed in the address table as indicated by step 52. If the destination address is determined to be in the address table in step 52 then the data unit is transmitted to the destination device or devices as indicated by step 55. Flow then returns to step 50. If the address is not located in the address table as determined in step 52, then the I/O ASIC determines whether the data unit is a multicast data unit, such as by examining the multicast bit in the data unit header as indicated by step 54. If the data unit is determined not to be a multicast data unit step 54 then the data unit is flooded as indicated by step 56 and flow returns to step 50. If the data unit is determined to be a multicast data unit in step 54 then the I/O ASIC determines whether the learn pending indicator is set for that I/O ASIC as indicated by step 58. If the learn pending bit is determined to be set in step 58 then the I/O ASIC floods the data unit to some or all of the ports in the switch, except the port on which the data unit was received, as indicated by step 60, and flow returns to step 50. If the learn pending indicator for the I/O ASIC is determined not to be set in step 58 then the learn pending bit is set as indicated by step 62 and the I/O ASIC then floods the data unit to some or all of the ports in the switch except the port on which the data unit was received. The data unit is also transmitted to the address resolution processor as indicated by step 64, and flow returns to step 50.

Figure 4:
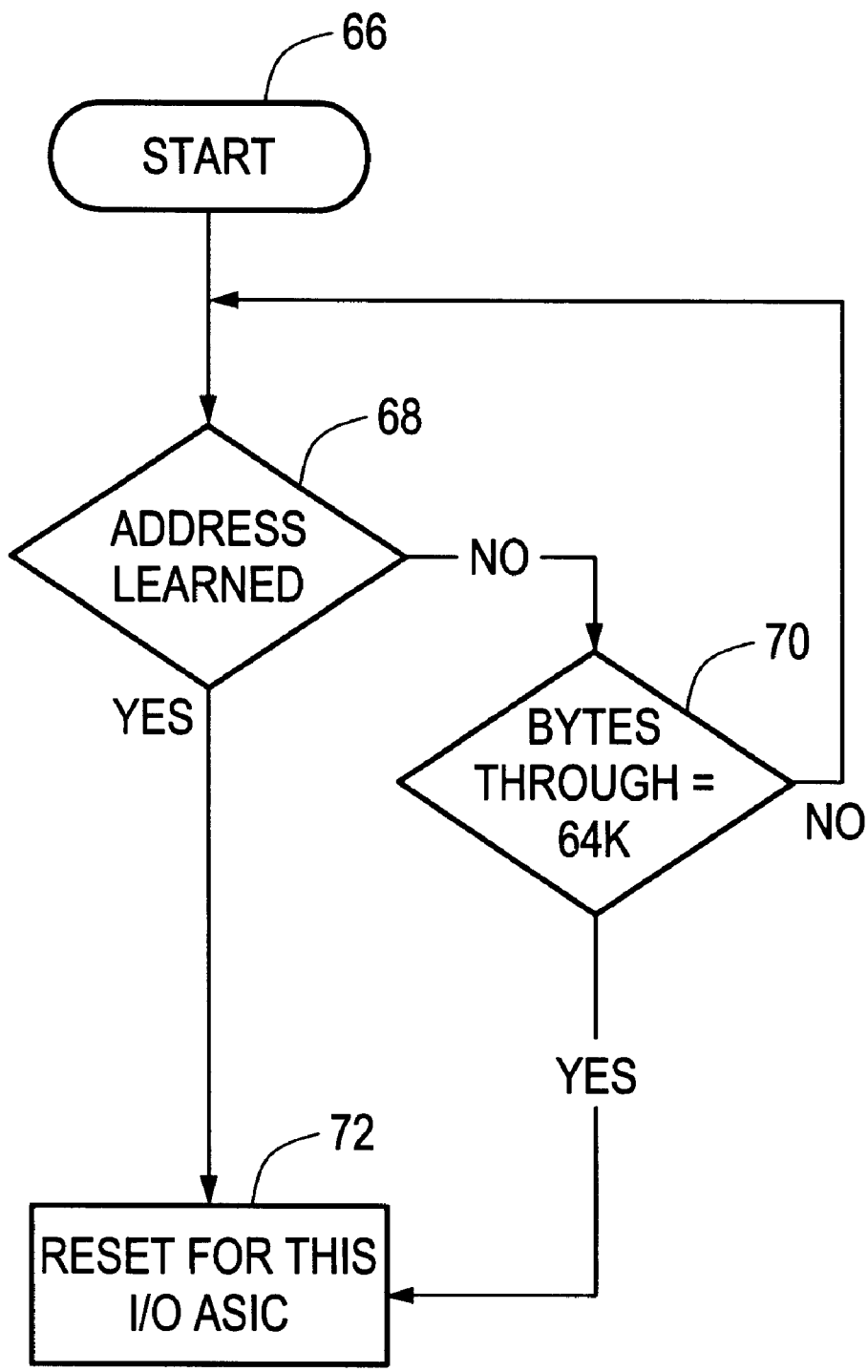
FIG. 4 is a flow diagram that illustrates resetting of the learn pending indicator.

The learn pending indicator is reset (cleared) when the learn operation is completed. A method for resetting of the learn pending indicator is illustrated in FIG. 4. The illustrated method operates in parallel with the method illustrated in FIG. 3. The start of the sequence is triggered when a data unit is transmitted to the address resolution processor for address learning, as depicted by step 66. If the address is determined to have been learned and the address resolution processor is done processing the data unit, as determined in step 68, the learn pending indicator is reset for the I/O ASIC as indicated by step 72. If the address has not been learned, as determined at step 68, and if at least a predetermined number of data units, e.g., 64K bytes, have passed through the FIFO 13, as determined at step 70, then the learn pending indicator is reset as depicted by step 72. If fewer than 64K bytes have passed through the FIFO 13 then flow returns to step 68. Hence, the learn pending indicator associated with the I/O ASIC remains set until either the address is learned or more than 64K bytes have passed through the FIFO. Step 70 could alternatively be based on a counter based on the switch clock. In particular, the interval for resetting the learn pending indicator may be based upon a predetermined time interval rather than the passage of a predetermined number of data units through the FIFO.

Having described the preferred embodiments of the invention, other embodiments and variations of the invention will be apparent to those skilled in the art. Therefore, the invention should not be viewed as limited to the disclosed embodiments but rather should be viewed as limited only by the spirit and scope of the appended claims.

What is claimed is:

1. A method for updating an address table in a network switch having an address resolution processor operative to facilitate an address learning operation by transmitting new address information to segments of a distributed address table and at least one input/output circuit that includes at least one port, comprising the steps of:

receiving a multicast data unit associated with a first multicast flow in one of said at least one output port of said input/output circuit;

searching in the address table for an entry that is pertinent to the multicast data unit;

determining whether an address learning operation is pending for the first flow at the address resolution processor; and if a pertinent entry is not located in said searching step and an address learning operation is not pending for the first flow at the address resolution processor, enqueueing at least a portion of the data unit with the address resolution processor to initiate an address learning operation.

2. The method of claim 1 including the step of setting a learn pending indicator when enqueueing at least a portion of the data unit with the learn processor.

3. The method of claim 2 including the step of maintaining a separate learn pending indicator for each input/output circuit.

4. The method of claim 3 including the step of resetting the learn pending indicator when the address learning information is transmitted from the address resolution processor to the segments of the distributed address table.

5. The method of claim 4 including the step of resetting the learn pending indicator after a predetermined length of time has passed to facilitate "loss frame recovery."

6. The method of claim 4 including the step of resetting the learn pending indicator after a predetermined number of data units have passed to facilitate "loss frame recovery."

7. A switch for facilitating transmission of multicast and unicast data units in a computer network, comprising:

a switch fabric;

a plurality of input/output circuits that are coupled to said switch fabric, each input/output circuit having a segment of a distributed address memory and at least one port through which data units are received;

an address resolution processor operative to derive address information from a multicast data unit enqueued with said address resolution processor and to distribute said address information to said address memory segments; and a separate learn pending indicator for each input/output circuit that indicates whether a multicast data unit is enqueued with said address resolution processor from that input/output circuit, wherein a multicast data unit received by one of said input/output circuits is not forwarded to said address resolution processor if said learn pending indicator for that input/output circuit indicates that a multicast data unit is enqueued with said address resolution processor.

8. The switch of claim 7 wherein each input/output circuit, upon receiving a multicast data unit, searches for a matching entry in the distributed address memory segment that indicates address information associated with that multicast data unit.

9. The switch of claim 8 wherein, if no matching entry is located in the distributed address memory segment, the input/out circuit determines whether the learn pending indicator associated with that input/output circuit is set and, if the learn pending indicator is not set, the input/output circuit enqueues the multicast data unit with the learn processor and sets the learn pending indicator.

10. The switch of claim 9 wherein the learn pending indicator is reset when the address information is transmitted from the address resolution processor to the address memory segments.

11. The switch of claim 10 wherein the learn pending indicator is reset after a predetermined length of time to facilitate "loss frame recovery."

12. The switch of claim 10 wherein the learn pending indicator is reset after a predetermined number of data units has passed to facilitate "loss frame recovery."

* * * * *